United States Patent [19]
Blumbach et al.

[11] Patent Number: 4,944,080
[45] Date of Patent: Jul. 31, 1990

[54] METHOD AND APPARATUS FOR THE LONGITUDINAL DEBURRING OF SECTIONS

[75] Inventors: Götz-Peter Blumbach, Schwerte; Willi Brueckner, Hagen; Rudolf Mueller, Ennepetal, all of Fed. Rep. of Germany

[73] Assignee: Hoesch Aktiengesellschaft, Dortmund, Fed. Rep. of Germany

[21] Appl. No.: 175,752

[22] Filed: Mar. 31, 1988

Related U.S. Application Data

[63] Continuation-in-part of Ser. No. 54,958, May 28, 1987, abandoned.

[30] Foreign Application Priority Data

May 30, 1986 [DE] Fed. Rep. of Germany ....... 3618224

[51] Int. Cl.$^5$ .................... B23P 13/02; B23C 3/12
[52] U.S. Cl. .................... 29/33 A; 409/140; 409/298
[58] Field of Search ............ 29/33 A, 33 P, 33 Q, 29/33 S, 33 T; 409/137, 138, 140, 139, 131, 132, 298, 301, 297

[56] References Cited

U.S. PATENT DOCUMENTS

| | | | |
|---|---|---|---|
| 2,256,558 | 9/1941 | Harder | 409/140 |
| 3,538,812 | 11/1970 | Morel | 409/137 X |
| 4,197,043 | 4/1980 | Houghton | 409/139 |
| 4,543,022 | 9/1985 | Bonner | 409/139 X |

FOREIGN PATENT DOCUMENTS

| | | | |
|---|---|---|---|
| 247387 | 12/1987 | European Pat. Off. | 409/140 |
| 3213550 | 11/1982 | Fed. Rep. of Germany | 409/138 |
| 3506866 | 9/1986 | Fed. Rep. of Germany | 409/140 |
| 223511 | 12/1983 | Japan | 409/140 |
| 19617 | 2/1984 | Japan | 409/139 |
| 209711 | 11/1984 | Japan | 409/139 |
| 48210 | 3/1985 | Japan | 409/138 |
| 114408 | 6/1985 | Japan | 409/140 |
| 197310 | 10/1985 | Japan | 409/138 |
| 213405 | 10/1985 | Japan | 409/138 |
| 238212 | 11/1985 | Japan | 409/138 |

*Primary Examiner*—William Briggs
*Attorney, Agent, or Firm*—Thomas S. Baker, Jr.

[57] ABSTRACT

Apparatus for the deburring of longitudinal sections by operating a milling head in response to the sensed position of a burr on the section.

11 Claims, 7 Drawing Sheets

METHOD AND APPARATUS FOR THE LONGITUDINAL DEBURRING OF SECTIONS

BACKGROUND OF THE INVENTION

This application is a continuation in part of earlier filed patent application Ser. No. 07/054,958 filed May 28, 1987 now abandoned. The invention relates to a method and apparatus for the longitudinal deburring of sections or profiles.

To achieve an exact geometric contour, special sections or profiles may be formed by rolling which results in a longitudinally extending rolling burr or flashing along some edges of the section. Such a rolling burr may have dimensions of between one and two mm in thickness and up to six mm of width. Burrs also are formed on profiles or sections which are rolled double and subsequently separated while hot. Rolling burrs or flashing previously were removed by a two-step process in which circular blades cut the burr and thereafter grinding wheels ground the burred edge or region. The disadvantage of the previous two-step method resides in the fact that the circular blades utilized in the cutting operation are difficult to position with a high degree of accuracy which may cause residual burrs to remain or which may cause damage to the material in the region of the burr and process requires a second, separate grinding operation.

SUMMARY OF THE INVENTION

The apparatus for longitudinal deburring of burred sections of the present invention comprises a drive unit for driving said section through said apparatus, a milling unit having a tool head and drive means for driving said milling unit to cause said unit to move in a horizontal direction or in a vertical direction. The apparatus includes a sensing means for detecting the position of said burr, connecting means for connecting the sensing means and the drive means and wherein said sensing means outputs a signal to said drive means to cause said milling unit to move to a position in which the tool head may remove the burr.

Additionally, the present invention includes a method for the longitudinal deburring of sections utilizing a drive unit for driving said section through the apparatus, a milling unit having a rotatable tool head and drive means for driving said milling unit to cause the unit to move in a horizontal direction or in a vertical direction. The apparatus further includes a sensing means and a connecting means for connecting the sensing means and the drive means. The method is characterized by the steps of driving said section through said apparatus, sensing the position of said burr on said section, outputting a signal to said drive means to cause said milling unit to move to a position in which said tool head may remove said burr, and rotating said tool head to remove said burr.

DESCRIPTION OF THE PREFERRED EMBODIMENT

The apparatus of the present invention senses the location of a longitudinally extending burr on a work piece or section and drives a milling head to properly position the head to remove the burr.

Figure 1:
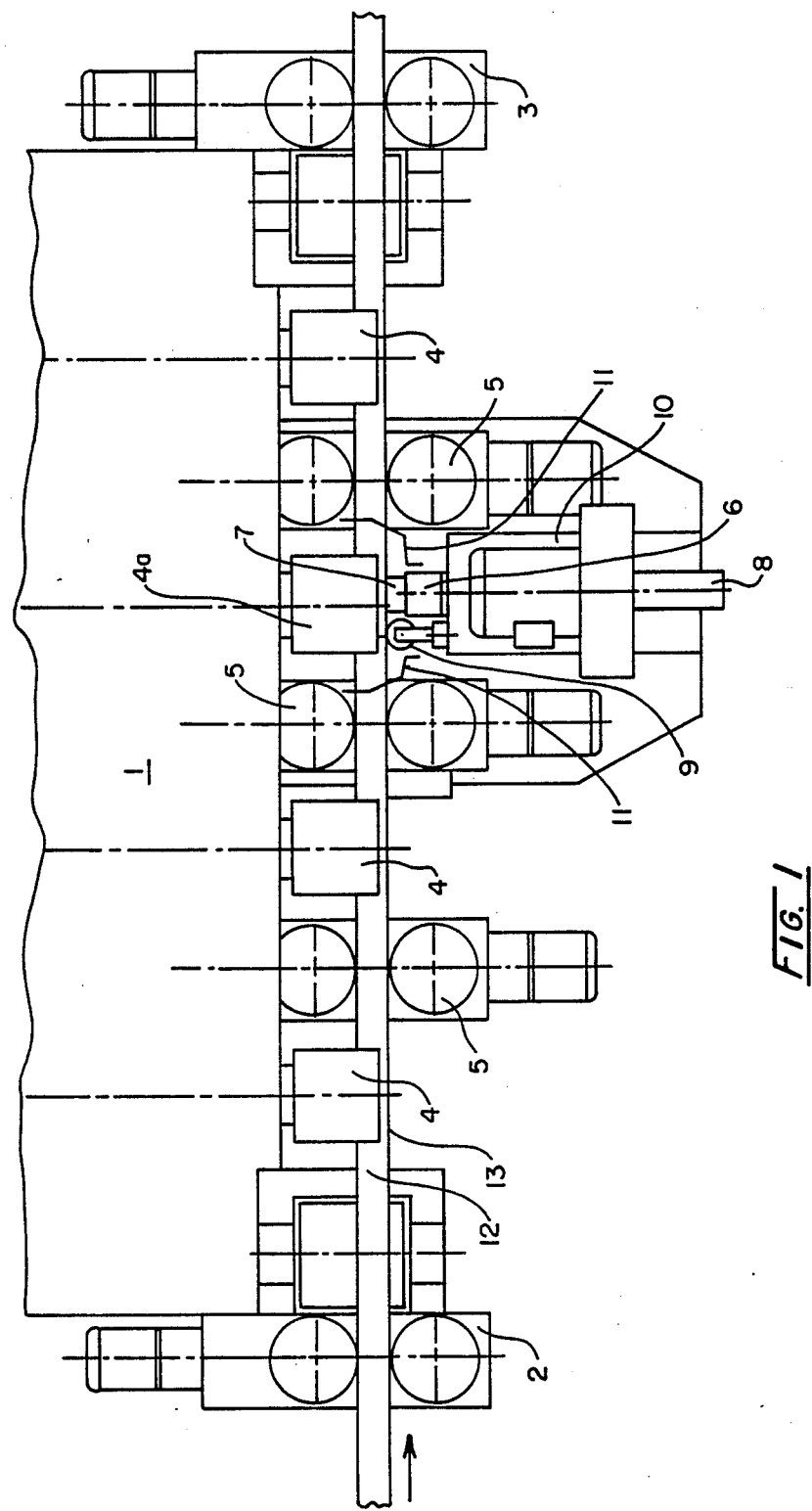
FIG. 1 presents a plan view of the apparatus for the longitudinal deburring of sections.

Turning to FIG. 1 of the drawings, the apparatus of the present invention for deburring longitudinal sections consists of a drive unit (1) having spaced pairs of entry guide rollers (2), exit guide rollers (3), and profiled horizontal and vertical spaced roller sets (4 and 5). The spaced horizontal and vertical roller sets (4 and 5) are rotated or driven by the drive unit (1). The rollers of the horizontal and vertical roller sets (4 and 5) have outer surfaces which complement the outer surface of the longitudinal section (12) which is driven through the apparatus to undergo a deburring operation along at least one longitudinal surface or edge.

Figure 2:
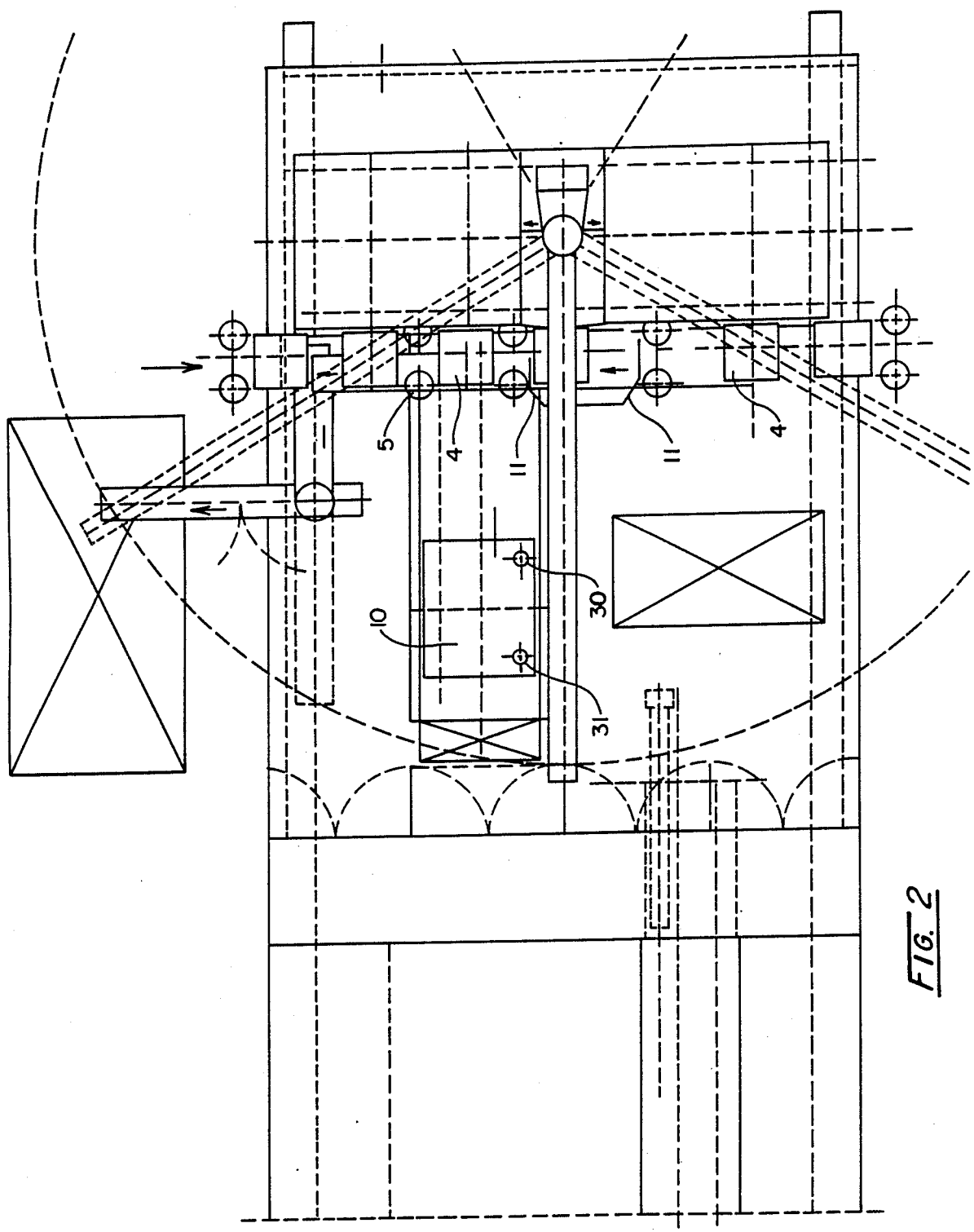
FIG. 2 is a plan view which encompasses the apparatus of FIG. 1 and illustrates some auxiliary devices utilized therewith.
Figure 3:
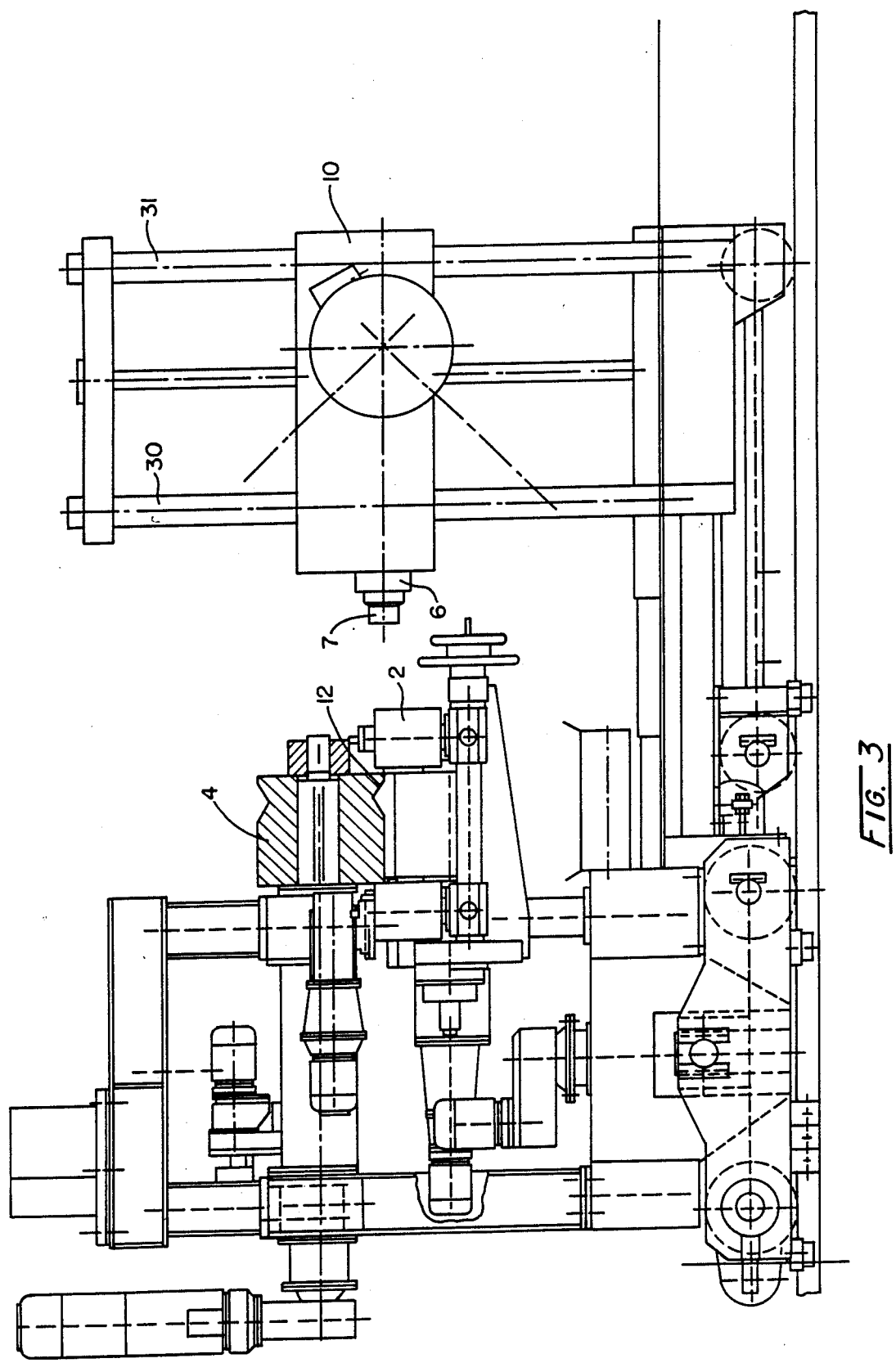
FIG. 3 provides an end view of the apparatus of FIG. 1.

Deburring of the longitudinal section (12) occurs by moving the head (7) of a milling unit (6) over the burred edge (13) (FIG. 7) of the section (12). Turning to FIGS. 2 and 3, it may be observed that the milling unit (6) is mounted on a compound table (10) that may be moved vertically along a pair of upstanding guide posts (30 and 31) by any conventional means such as a hydraulic cylinder, or a rack and pinion, not shown. Additionally, the compound table (10) may be moved laterally toward and away from the longitudinal section work piece (12) by any conventional means which may again include a hydraulic cylinder or a rack and pinion, not shown. Thus, the milling unit (6) may be positioned as required to remove the burr (13).

Figure 4:
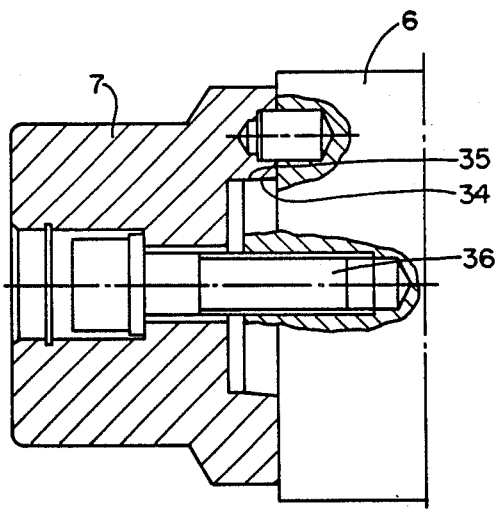
FIG. 4 is an enlarged cross-sectional view of the milling head and the milling spindle utilized on the longitudinal deburring apparatus.
Figure 5:
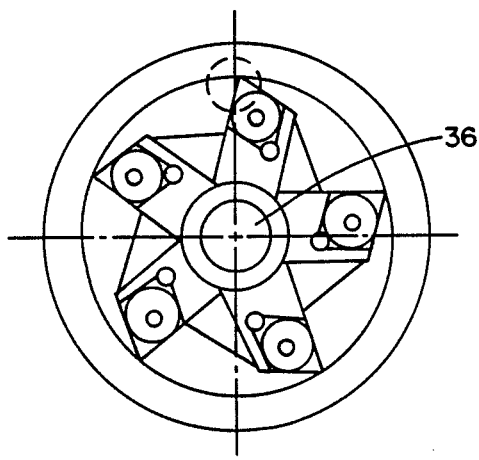
FIG. 5 is a side view of the milling head of FIG. 4.

Turning to FIGS. 4 and 5, it may be observed that the milling head (7) is mounted precisely on the milling unit or spindle (6) by the complementary angled surfaces (34 and 35) formed on the milling head (7) and the milling unit (6) respectively. A central longitudinally extending bolt (36) fastens the tool head (7) to the milling unit (6).

Figure 6:
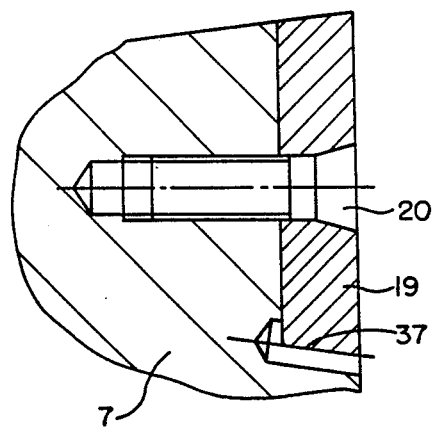
FIG. 6 is a cross-sectional view of one of the turnover cutting blades affixed to the milling head.
Figure 7:
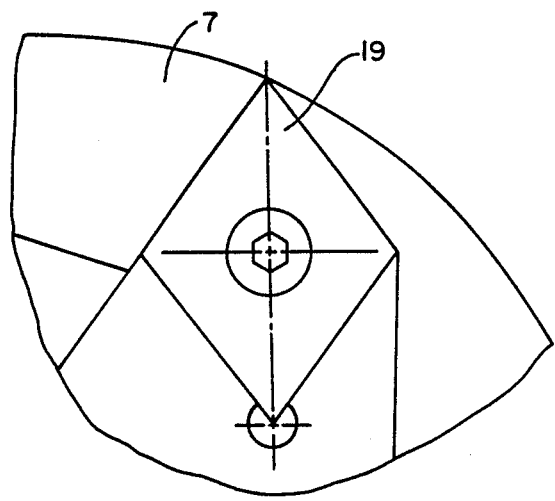
FIG. 7 is a side view of the cutting blade illustrated in FIG. 6.

Turning to FIGS. 6 and 7, it may be observed that the tool head (7) mounts a plurality of cutting blades (19). The cutting blades (19) are mounted in tapered recesses (37) formed in the surface of tool head (7) and are retained in position by a plurality of countersunk bolts (20). In this way the cutting blades (19) are self-centering, self-positioning, and easily clamped or unclamped from the tool head (7). The cutting blades (19) mounted on tool head (7) may be contoured to provide the desired shape for the deburred portion of the longitudinal section (12).

As may be seen from the above, the drive unit (1) acts to move the compound table (10) containing the tool head (7) in such a manner that the milling unit (6) effectively deburrs the appropriate portion of longitudinal section (12).

Figure 9:
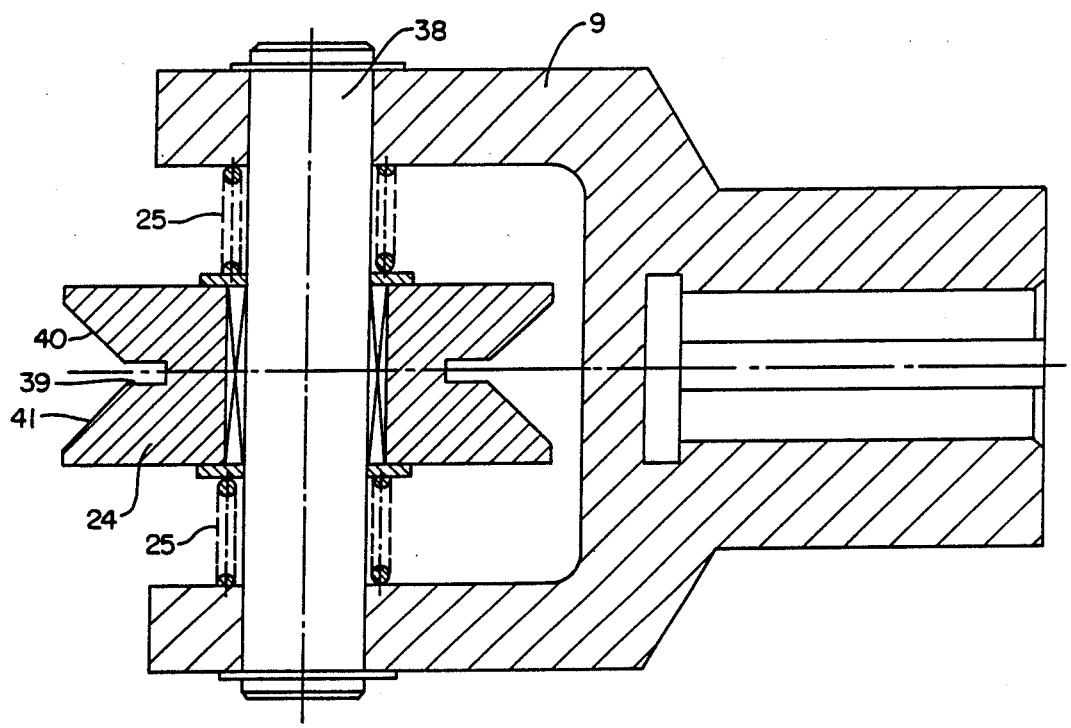
FIG. 9 is a cross-sectional view of a roller sensor and a wheel sensor used in the longitudinal deburring apparatus.

Turning to FIG. 1, a hydraulic copying unit (8) having a roller sensor (9) detects or senses the exact position of the burred portion (13) of longitudinal section (12) and operates to output signals which cause the compound table (10) and milling unit (6) to move vertically and laterally such that the tool head (7) is properly positioned to cut the burr (13) from the section (12) and provide a proper contour for the deburred portion of the section. Turning to FIG. 9, the roller sensor (9) mentioned in connection with FIG. 1 may be seen in greater detail. Roller sensor (9) incorporates a bearing mounted wheel sensor (24) rotatably mounted on a fixed shaft (38). A pair of springs (25), act to center the wheel sensor (24) and to accommodate small displacements of the longitudinal section (12) as will be discussed hereinbelow. It may be observed that wheel sensor (24) contains a groove (39) that is centered between a pair of angled faces (40 and 41). The angled faces (40 and 41). are adapted to rest upon the longitudinal section (12) on opposite sides of the burr (13). The central groove (39) is adapted to receive the burr (13) so that the wheel sensor (24) is not damaged by the burr. Although not shown, roller sensor (12) is biased by conventional means such as a spring into contact with the longitudinal section (12). As that section moves past the roller sensor (9) and causes the wheel sensor (24) to rotate some lateral and longitudinal movement of the wheel sensor (24) and roller sensor (9) occurs due to variations in the surface dimensions of the section. This lateral and/or longitudinal movement of wheel sensor (24) and roller sensor (9) is detected by a conventional means such as pairs of limit switches or by direct connection to hydraulic control valves. The limit switches or the control valves cause a signal to be output to a driving device such as a motor or a pump and hydraulic cylinder to cause the compound table (10) and the milling unit (6) to be moved to a position where the cutting blades (19) on the tool head (7) can quickly and efficiently remove the burr (13) from the sensed portion of the longitudinal section (12).

It should be noted that the type of control utilized to cause the milling unit (6) to follow the contour of the burred portion (13) of longitudinal section (12) does not have to be of any particular type. It may be an open loop type control in which the roller sensor (9) directly actuates a control valve to cause the compound table (10) and the milling unit (6) to be moved to a desired position or it may be a closed loop type of control system in which the system constantly examines the position of roller sensor means (9) and makes corrections to ensure that it remains at a pre-selected position. The essential feature of the control system of the present apparatus is that the exact longitudinal position of the section work piece (12) sensed by wheel sensor (24) must be the same position on the section (12) that encounters the cutting blades (19) of milling unit (6) when the compound table (10) and the milling head (6) are moved in response to a movement of the roller sensor (9). In other words, it is important to ensure that the position of the longitudinal section (12) that encounters the cutting blade (19) corresponds with the same position on the longitudinal section (12) that was sensed by the roller sensor (9). To this end, it is desirable to have the roller sensor (9) positioned as close as possible to the cutting blades (19) of tool head (7).

In the longitudinal deburring apparatus of the present invention the chips that accumulate during the deburring operation must be removed in a reliable manner. Any chips that remain on the longitudinal section (12) may cause damage to the section. Accordingly, the chips are removed by means of a suction apparatus (11) positioned just upstream of the milling unit (6).

Figure 8:
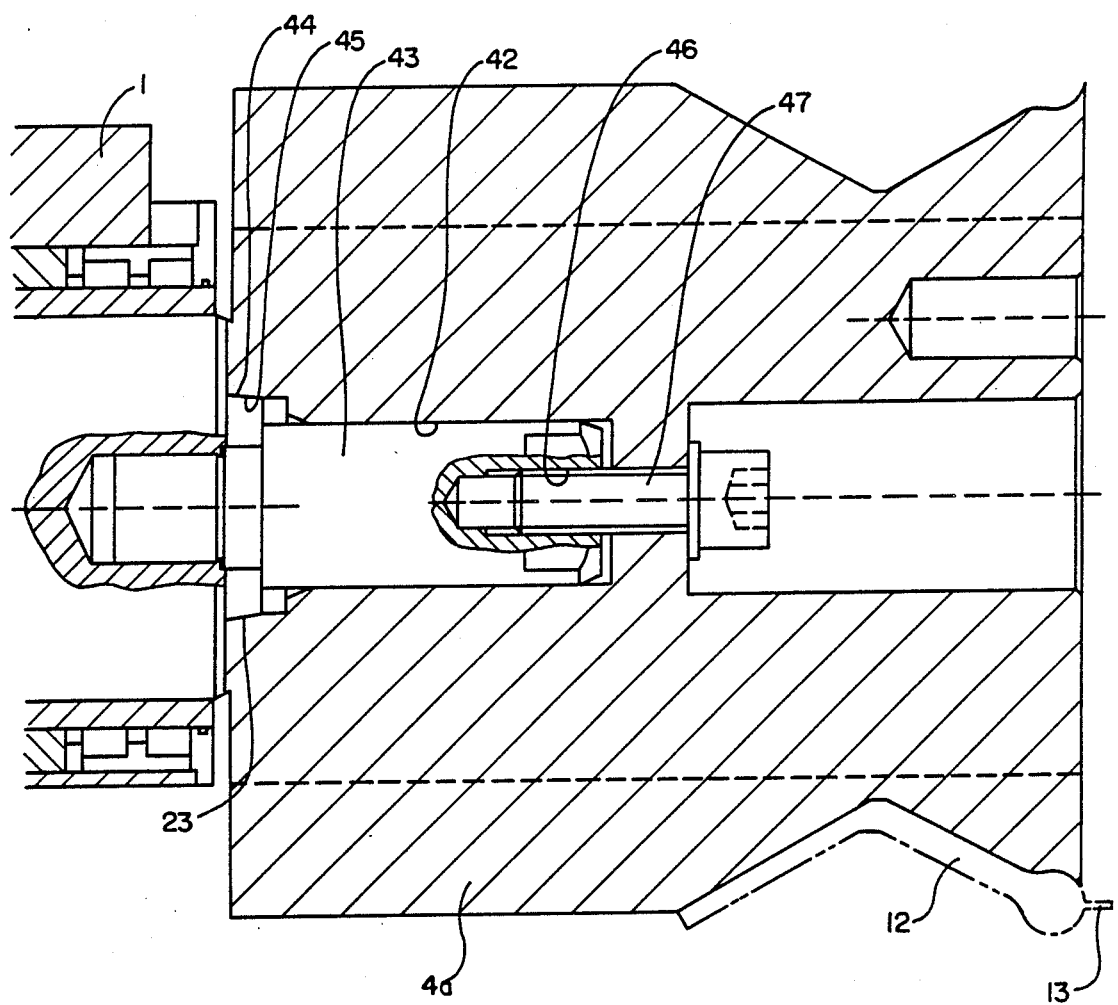
FIG. 8 is a cross-sectional view of a horizontal drive roller.

Turning to FIG. 8 the mounting means for one of the horizontal rollers may be discerned. It may be seen that the roller (4) contains a central bore (42) adapted to receive a drive shaft (43) that projects from drive unit (1). The drive shaft (43) incorporates a tapered external surface (44) that receives a complementary tapered surface (45) formed in the central bore (42). Drive shaft (43) also contains a threaded bore (46) that is adapted to receive a bolt (47) which secures the roller (4) to drive shaft (43). Thus it may be seen that the horizontal rollers (4) may be replaced by removing a single bolt (47). Such ease of replacement becomes important because new horizontal and vertical drive roller sets (4 and 5) must be installed each time the exterior geometry and/or dimensions of the longitudinal section (12) change.

It should be noted that tool head (7) may be of the type to accommodate vortex or eddy milling. Additionally, the number of tools mounted on the head (7) may be varied to accommodate the desired past speed of the section (12) to be worked. It is also possible to remove a plurality of longitudinal burrs on sections simultaneously using a corresponding number of milling units for one working operation.

Since certain changes may be made to the above described apparatus, system and method without departing from the scope of the invention herein, it is intended that all matter contained in the description thereof shown in the accompanying drawings shall be interpreted as illustrative and not in a limiting sense.

We claim:

1. A method for longitudinal deburring of sections utilizing an apparatus comprising a drive unit for driving said section through said apparatus, a milling unit having a rotatable tool head, drive means for driving said milling unit to enable said unit to move in a horizontal direction and in a vertical direction, sensing means for detecting the position of said burr, connecting means for connecting said sensing means and said drive means, wherein said sensing means outputs a signal to said drive means to cause said milling unit to move to a position in which said tool head may remove said burr and said sensing means comprises a roller sensor having a roller that engages said section on opposite sides of the burr characterized by the steps of driving said section through said apparatus, sensing the position of said burrs on said section with said roller sensor, outputting a signal from said roller sensor to said drive means to cause said milling unit to move to a position in which said tool head may remove said burr and rotating said tool head to remove said burr.

2. Apparatus for longitudinal deburring of burred sections characterized by a drive unit for driving said section through said apparatus, a milling unit having a rotatable tool head, drive means for driving said milling unit to enable said unit to move in a horizontal direction and in a vertical direction, sensing means for detecting the position of said burr, connecting means for connecting said sensing means and said drive means, wherein said sensing means outputs a signal to said drive means to cause said milling unit to move to a position in which said tool head may remove said burr and wherein said sensing means comprises a roller sensor having a roller that engages said section on opposite sides of said burr.

3. Apparatus for longitudinal deburring of burred sections according to claim 2, characterized in that said roller includes a groove adapted to receive said burr.

4. Apparatus for longitudinal deburring of burred sections according to claim 2, characterized in that said roller includes a pair of angled surfaces adapted to engage said section.

5. Apparatus for longitudinal deburring of burred sections according to claim 2, characterized in that said drive unit comprises entry guides, exit guides, horizontal drive roller sets and vertical drive roller sets.

6. Apparatus for longitudinal deburring of burred sections according to claim 2, characterized in that the milling unit comprises a milling spindle and a tool head.

7. Apparatus for longitudinal deburring of burred sections according to claim 6, characterized in that the tool head comprises tools in the form of cutting blades, and said tool head includes means for positioning said cutter blades.

8. Apparatus for longitudinal deburring of burred sections according to claim 7, characterized in that said positioning means includes a pair of complementary angled surfaces formed on said tool head and on said blades.

9. Apparatus for longitudinal deburring of burred sections characterized by a drive unit for driving said section through said apparatus, a milling unit having a rotatable tool head, drive means for driving said milling unit to enable said unit to move in a horizontal direction and in a vertical direction, sensing means for detecting the position of said burr, connecting means for connecting said sensing means and said drive means, wherein said sensing means outputs a signal to said drive means to cause said milling unit to move to a position in which said tool head may remove said burr, said drive unit comprises entry guide, exit guides, horizontal drive roller sets and vertical drive roller sets, attaching means for attaching and detaching each of said vertical and horizontal drive rollers from said drive unit and wherein each of said rollers includes a tapered surface which engages a complementary surface formed on said drive unit.

10. Apparatus for longitudinal deburring of burred sections according to claim 9 further characterized by control means for controlling the speed of the horizontal and vertical roller sets.

11. Apparatus for longitudinal deburring of burred sections according to claim 2, characterized in that said apparatus includes suction means adjacent said million unit for cleaning said section.

* * * * *